United States Patent Office 3,284,299
Patented Nov. 8, 1966

3,284,299
MUSCLE RELAXANT COMPOSITIONS
AND METHODS
William R. McGrath and Edward M. Roberts, Cincinnati, Ohio, assignors to Richardson-Merrell Inc., New York, N.Y., a corporation of Delaware
No Drawing. Filed Oct. 21, 1963, Ser. No. 317,767
5 Claims. (Cl. 167—65)

This invention relates to naphthalene derivatives which have the ability to induce a centrally mediated muscle relaxation in animals. In a particular aspect this invention relates to aminooxyalkylnaphthalene compounds which are valuable for use in relieving skeletal muscle spasm and other conditions in which neuromuscular dysfunction is a factor.

The invention compounds exhibit high potency and suitable duration of action. These compounds are also readily soluble in water and are well absorbed when administered orally.

The present invention is based on the unexpected discovery that certain aminoxyalkylnaphthalene compounds have the ability to reduce or block the activity of polysynaptic spinal reflexes in animals, while having little or no effect on monosynaptic reflexes.

The particular compounds which have muscle relaxation activity are those corresponding to the formula:

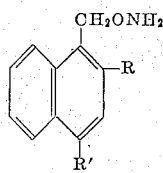

wherein R and R' are selected from the group consisting of hydrogen and methyl, and at least one of R and R' is hydrogen.

The compounds of the present invention are conveniently synthesized by the condensation of the appropriate naphthylalkylchloride with hydroxyurethane in ethanolic solution, in the presence of potassium hydroxide, to form the corresponding naphthylmethyloxyurethane, followed by alkaline hydrolysis of the carbalkoxy group and decarboxylation to the desired aminoxyalkylnaphthalene.

Treatment of the invention aminoxyalkylnaphthalene compounds with equivalent amounts of inorganic or organic acids such as hydrochloric acid, glycolic acid, lactic acid, maleic acid, and the like yields the corresponding pharmaceutically acceptable salts.

The invention compounds can be administered to patients in amounts varying between 50 and 3000 milligrams per dose, depending on the route of administration, employing dosage units containing 50 to about 500 milligrams of active ingredient.

The compounds of the present invention were compared with mephenesin (3-o-toloxypropane-1,2-diol), a muscle relaxant of known clinical utility, for effects on the polysynaptic flexor and linguomandibular reflexes and the monosynaptic patellar reflex in chloralose-anesthetized cats. The invention compounds were compared with mephenesin as to the effective doses in inducing paralysis in mice, and also as to the effect of the invention compounds in antagonizing strychnine-induced convulsions in mice as compared with mephenesin. The comparison tests with mephenesin demonstrated that the invention compounds have a valuable combination of properties for use as muscle relaxants.

The pharmacologic tests used in evaluation of the invention compounds were conducted using the following procedures.

DEPRESSION OF SPINAL REFLEXES IN THE CAT [1]

A cat is anesthetized with chloralose. The tibial nerve is exposed, and cut. The central stump of the cut nerve is attached to a pair of electrodes connected to a variable output square wave stimulator. The tibialis anticus muscle is dissected free from its insertion in the foot. A thread is attached to the tendon of the muscle and arranged through a pulley and lever system to record contractions of the muscle on a smoked paper kymograph. The cephalad portion of the tibial nerve is electrically stimulated with a voltage adequate to give a maximal contraction of the tibialis anticus muscle. The muscle contractions measure the activity of the flexor reflex, a polysynaptic spinal reflex.[2]

In the same animal, the head is firmly fixed, needle electrodes are placed in the tongue and a thread attached to the lower jaw, and arranged through a pulley and lever system to record jaw movements on the smoked paper kymograph. The movements of the jaw recorded in response to electrical stimulation of the tongue measure the activity of the linguomandibular reflex, a polysynaptic bulbar reflex.[3]

In the same cat, the hind leg contralateral to that used for recording the flexor reflex is arranged for recording the patellar, or knee-jerk reflex, a monosynaptic spinal reflex.[2] This reflex is elicited by tapping the patellar tendon with an electromagnetically operated hammer and recording movements of the foot.

Since severe skeletal muscle spasm involves increased activity of polysynaptic reflexes, but not of monosynaptic reflexes, the goal in developing muscle relaxants is to find a substance which will effectively block polysynaptic reflexes, i.e., the flexor and linguo-mandibular reflexes, and leave monosynaptic reflexes, i.e., the patellar reflex, largely unaffected.[4]

Drugs to be tested are injected intravenously through the jugular vein in graded doses. Dose is plotted against percent reduction in height of muscle contraction, and the dose causing a 50 percent reduction ($ED_{50}$) is determined by extrapolation from the curve obtained in this manner.

INDUCTION OF PARALYSIS IN MICE

This procedure allows the gross evaluation of muscle relaxing (paralyzing) activity in the conscious unrestrained animal.

Drugs to be tested are administered intraperitoneally or orally in graded doses to groups of six mice per dose level. The number of animals losing their righting reflexes (ability to regain their normal posture when placed on their backs) at each dose is recorded. Percent response is plotted against dose on a probability-logarithm scale and the $ED_{50}$ (dose causing paralysis in 50 percent of animals) is determined by extrapolation from the curve so constructed.

ANTAGONISM OF STRYCHNINE-INDUCED EXTENSOR CONVULSIONS IN MICE

This procedure provides an additional means of evaluating spinal reflex block.

Strychnine induces extensor convulsions through a stimulation of spinal neurons. This effect of strychnine is a powerful one and is difficult to block. Drugs were administered intraperitoneally 20 minutes prior to the intraperitoneal administration of 2.7 mg./kg. of strychnine. This dose of strychnine is adequate to induce convulsions ---
[1] Henneman, E., Kaplan, A., Unna, K.: J. Pharmacol. Exptl. Therap., 97, 331, 1949.
[2] Berger, F. M.: Pharmacol. Rev., 1, 243, 1949.
[3] King, E. E., Unna, K.: J. Pharmacol. Exptl. Therap., 111, 293, 1954.
[4] Goodman, L. S., Gilman, A.: The Pharmacological Basis of Therapeutics, pp. 206–209, Macmillan, New York, 1955.

and death in 100 percent of the test animals. Eight animals were used at each dose level of the test drug. The number of animals at each dose which were protected from the convulsant activity of strychnine was recorded. The results were plotted on a log-probability scale and the $ED_{50}$ (dose effective in preventing convulsions in 50 percent of animals) for preventing strychnine-induced extensor convulsions was determined by extrapolation.

ACUTE TOXICITIES IN MICE

The test drugs were administered in graded doses to groups of eight mice per dose. The number of mice dying within twenty-four hours at each dose was recorded. Percent deaths were plotted against dose on a log-probability scale and the $LD_{50}$ (dose causing death in 50 percent of the animals) determined by extrapolation.

In the tables below the invention compounds tested against mephenesin are identified as follows:

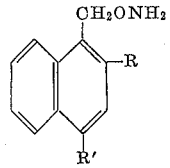

I $R$=methyl and $R'$=hydrogen
II $R$=hydrogen and $R'$=methyl
III $R$=$R'$=hydrogen

TABLE A.—DEPRESSION OF SPINAL REFLEXES IN THE CAT

| Drug | $ED_{50}$ (mg./kg. I.V.) | | |
|---|---|---|---|
| | Linguomandibular | | |
| | Flexor Reflex | Reflex | Patellar Reflex |
| I | 6.4 | 9.0 | [1] >30 |
| II | <10.0 | ca. 10.0 | [1] >10 |
| III | ca. 20.0 | ca. 20.0 | [1] >20 |
| Mephenesin | 12.0 | 11.0 | [1] >25 |

[1] No effect at these doses.

TABLE B.—INDUCTION OF PARALYSIS IN MICE

| Drug | $ED_{50}$ (mg./kg.) | |
|---|---|---|
| | I.P. | Oral |
| I | 120 | 430 |
| II | 172 | |
| III | 170 | |
| Mephenesin | 153 | 360 |

TABLE C.—ANTAGONISM OF STRYCHNINE-INDUCED EXTENSOR CONVULSIONS IN MICE

| Drug | $ED_{50}$ (mg./kg. I.P.) |
|---|---|
| I | 220 |
| Mephenesin | [1] >550 |

[1] Inactive in this dose.

TABLE D.—ACUTE TOXICITIES IN MICE

| Drug | $LD_{50}$ (mg./kg.) | |
|---|---|---|
| | I.P. | Oral |
| I | 500 | 1,210 |
| II | 465 | |
| III | 465 | |
| Mephenesin | 520 | 1,600 |

The data in Table A indicate that the invention compounds have good potency in reducing the activity of polysynaptic reflexes and show the desired selectivity of effect in that they do not appear to affect monosynaptic reflexes. Compounds I and II exceed mephenesin in potency.

The data in Table B indicate that the invention compounds have a similar range of potency as mephenesin in inducing paralysis in mice with Compound I being somewhat more potent and Compounds II and III being slightly less potent than mephenesin. The oral data show that good oral absorption can be obtained.

The data in Table C show that Compound I is more potent and effective than mephenesin in antagonizing strychnine-induced extensor convulsions in mice. This indicates that the block induced by Compound I is stronger since it is not easily overridden by the powerful stimulatory effects of strychnine.

The data in Table D indicate that the acute lethal doses of the test compounds are similar to the acute lethal dose of mephenesin and that the separation between muscle relaxing and lethal doses is adequate.

The following examples illustrate specific embodiments of the present invention.

EXAMPLE 1.—1-AMINOXYMETHYL-2-METHYL-NAPHTHALENE

A solution of 19.07 grams of 1-chloromethyl-2-methylnaphthalene, 6.17 grams of potassium hydroxide in 66 milliliters of 95 percent ethanol, 12 milliliters of hydroxyurethane and 25 milliliters of 95 percent ethanol was heated at reflux for three hours. At the end of the reaction time, potassium chloride, which had precipitated from the refluxing solution, was removed by vacuum filtration. The filtrate was heated on the steam bath under vacuum to reduce the volume to about 50 milliliters. This solution was then heated on the steam bath with 50 milliliters of 20 percent aqueous potassium hydroxide for 1.5 hours to hydrolyze and decarboxylate the urethane. Water (200–300 milliliters) was added and the mixture was extracted with ether. The ether extracts were washed with water and dried over sodium sulfate.

The ether solution was treated with 17 milliliters of alcoholic hydrogen chloride (6 meq. of HCl/ml.) to give a white precipitate of hydrochloride salt. The salt was collected by filtration and dried, 11.24 grams (50.1 percent yield), M.P. 187–187.5° C. Recrystallization from methanolacetonitrile yielded the purified salt, M.P. 198–199° C.

EXAMPLE 2.—1-AMINOXYMETHYLNAPHTHALENE

In the same manner as Example 1, 1-aminoxymethylnaphthalene was prepared. The melting point of the hydrochloride salt was 192–193° C.

EXAMPLE 3.—1-AMINOXYMETHYL-4-METHYL-NAPHTHALENE

In the same manner as the previous Examples, 1-aminoxymethyl-4-methylnaphthalene was prepared. The corresponding hydrochloride salt had a melting point of 176–176.5° C.

EXAMPLE 4.—500 MILLIGRAM TABLETS 5 kilograms of 1-aminoxymethyl-2-methylnaphthalene hydrochloride and 0.5 kilogram of ethylcelluluose are micropulverized in a Raymond mill, and then granulated with isopropyl alcohol. The granulation is passed through a No. 4 screen, air dried to remove the solvent and passed through a No. 10 oscillator screen.

0.75 kilogram of corn starch powder, U.S.P. and 0.05 kilogram of magnesium stearate are added to the granulation and the mixture is compressed into $^{15}\!/_{32}$″ tablets weighing 630 milligrams each. Sugar coating is applied by any standard method.

EXAMPLE 5.—250 MILLIGRAM TABLETS 2.5 kilograms of 1-aminoxymethylnaphthalene hydrochloride is micropulverized in a Raymond mill and then mixed with 1.2 kilograms of lactose, U.S.P., 0.8 kilogram sucrose, U.S.P. and 0.25 kilogram of corn starch powder, U.S.P. The mixture is granulated with a 5 percent starch paste and passed through a No. 4 screen. The granulation is dried and passed through a No. 10 oscillator screen. 0.05 kilogram of magnesium stearate and 0.25 kilogram of corn starch powder are added to the granulation and mixed thoroughly.

The mixture is compressed into a standard 7/16" cup tablet weighing 505 milligrams each and sugar coated by a standard procedure.

EXAMPLE 6.—LIQUID (ELIXIR)—500 MILLIGRAMS PER TEASPOON 100 grams of 1-aminoxymethyl-2-methylnaphthalene hydrochloride, 1 gram of saccharin, 1.5 milliliters of compound orange spirit and 0.34 milliliter of anethole are dissolved in 300 milliliters of alcohol, U.S.P.

350 milliliters of propylene glycol are added, then 0.1 gram of tartrazine (F.D. and C. Yellow No. 5) dissolved in 50 milliliters of purified water are added along with sufficient purified water to make a total volume of 1000 milliliters. The solution is mixed and filtered to produce a clear elixir.

EXAMPLE 7.—500 MILLIGRAM CAPSULES 500 grams of maleic acid salt of 1-aminoxymethyl-4-methylnaphthalene are micropulverized and mixed with 20 grams of lactose, U.S.P. and 5 grams of magnesium stearate. The mixture is encapsulated in hard gelatin No. 00 capsules so that each capsule contains 525 milligrams of powder.

EXAMPLE 8.—INJECTABLE SOLUTION OF 100 MILLIGRAMS PER MILLILITER 1 gram of 1-aminoxymethyl-2-methylnaphthalene hydrochloride is dissolved in 10 milliliters of 50 percent aqueous polyethylene glycol 300 solution and 0.1 percent sodium bisulfite is added as a preservative agent.

EXAMPLE 9.—ORAL SUSPENSION OF 500 MILLIGRAMS PER 5 MILLILITERS 100 grams of 1-aminoxymethylnaphthalene hydrochloride is micropulverized and made into a paste with a small amount of glycerine. 100 grams of carboxymethylcelluluose (medium viscosity) is dissolved in 200 milliliters of purified water.

The drug paste is suspended in the carboxymethylcellulose suspension with stirring. 1 gram of citric acid is added to the stirred suspension and the volume is increased to 1000 milliliters by the addition of purified water. The suspension is homogenized by passing it through a colloid mill.

What is claimed is:

1. A method for inducing a centrally mediated muscle relaxation which comprises administering to animals an effective amount of an aminoxyalkylnaphthalene of the formula:

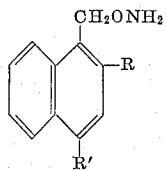

wherein R and R' are selected from the group consisting of hydrogen and methyl, and at least one of R and R' is hydrogen.

2. A pharmaceutical preparation in dosage unit form adapted for the treatment of muscle spasms comprising a solid pharmaceutical carrier and from about 50 milligrams to about 500 milligrams per dosage unit of aminoxyalkylnaphthalene of the formula:

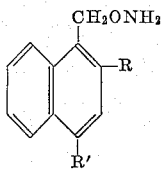

wherein R and R' are selected from the group consisting of hydrogen and methyl, and at least one of R and R' is hydrogen.

3. The pharmaceutical preparation of claim 2 wherein said aminoxyalkylnaphthalene is in the form of a pharmaceutically acceptable acid addition salt.

4. A pharmaceutical preparation of claim 3 wherein the acid addition salt of said aminoxyalkylnaphthalene is an acid addition salt of 1-aminoxymethyl-2-methylnaphthalene.

5. A method for inducing muscle relaxation which comprises administering to an animal suffering from skeletal muscle spasm an effective amount of an aminoxyalkylnaphthalene of the formula:

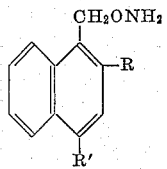

wherein R and R' are selected from the group consisting of hydrogen and methyl, and at least one of R and R' is hydrogen.

References Cited by the Examiner

Chem. Abs., vol. 54, p. 9758(f), (g), 1960.

JULIAN S. LEVITT, *Primary Examiner.*

NORRIS G. MANN, STANLEY J. FRIEDMAN,
*Assistant Examiners.*